US012798387B2

United States Patent

(12) United States Patent
Du et al.

(10) Patent No.: US 12,798,387 B2
(45) Date of Patent: Nov. 17, 2026

(54) HYBRID ELECTRIC VEHICLE AND METHOD OF REGENERATIVE BRAKING CONTROL FOR SAME

(71) Applicants: HYUNDAI MOTOR COMPANY, Seoul (KR); KIA CORPORATION, Seoul (KR)

(72) Inventors: Gwang Il Du, Ansan-si (KR); Jae Young Choi, Seoul (KR); Min Gyun Jo, Ansan-si (KR); Geon Young Choi, Hwaseong-si (KR); Chun Hyuk Lee, Seongnam-si (KR); Seul Gi Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 210 days.

(21) Appl. No.: 17/989,433

(22) Filed: Nov. 17, 2022

(65) Prior Publication Data

US 2023/0406112 A1 Dec. 21, 2023

(30) Foreign Application Priority Data

Jun. 21, 2022 (KR) ........................ 10-2022-0075730

(51) Int. Cl.
*B60L 7/26* (2006.01)
*B60L 58/15* (2019.01)
(Continued)

(52) U.S. Cl.
CPC ................ *B60L 7/26* (2013.01); *B60T 8/172* (2013.01); *B60T 8/3215* (2013.01); *B60W 10/02* (2013.01);
(Continued)

(58) Field of Classification Search
CPC . B60L 7/26; B60L 58/15; B60T 8/172; B60T 8/3215; B60T 2270/604;
(Continued)

(56) References Cited

U.S. PATENT DOCUMENTS

2004/0069548 A1 4/2004 Kira et al.
2013/0123063 A1* 5/2013 Song ...................... B60K 6/442 180/65.265
(Continued)

FOREIGN PATENT DOCUMENTS

JP H0799704 A 4/1995
JP H0851701 A 2/1996
(Continued)

OTHER PUBLICATIONS

English Machine Translation of JP-2016049838-A (Year: 2016).*
(Continued)

*Primary Examiner* — Andrew J Cromer
(74) *Attorney, Agent, or Firm* — Lempia Summerfield Katz LLC

(57) ABSTRACT

A hybrid electric vehicle (HEV) that can perform more efficient regenerative braking and a method of regenerative braking control for the same are disclosed. The method of regenerative braking control includes determining a total braking amount when a braking request is generated in a HEV including a first motor connected to an engine, a second motor directly connected to an input side of a transmission, and an engine clutch having a first end connected to the first motor and a second end connected to the second motor. The method also includes charging a battery using regenerative braking of the first motor when the engine clutch has been engaged in consideration of at least
(Continued)

the total braking amount and charge power by regenerative braking of the second motor is less than charge limit power of the battery.

12 Claims, 3 Drawing Sheets

(51) Int. Cl.

| | |
|---|---|
| ***B60T 8/172*** | (2006.01) |
| ***B60T 8/32*** | (2006.01) |
| ***B60W 10/02*** | (2006.01) |
| ***B60W 10/184*** | (2012.01) |
| ***B60W 10/196*** | (2012.01) |
| ***B60W 20/40*** | (2016.01) |
| ***B60W 30/18*** | (2012.01) |

(52) U.S. Cl.
CPC ........ *B60W 10/184* (2013.01); *B60W 10/196* (2013.01); *B60W 20/40* (2013.01); *B60W 30/18127* (2013.01); *B60W 30/18136* (2013.01); *B60L 58/15* (2019.02); *B60T 2270/604* (2013.01); *B60W 2510/18* (2013.01); *B60W 2510/244* (2013.01); *B60W 2710/021* (2013.01); *B60W 2710/18* (2013.01); *B60W 2710/244* (2013.01)

(58) Field of Classification Search
CPC .. B60W 10/02; B60W 10/184; B60W 10/196; B60W 20/40; B60W 30/18127; B60W 30/18136; B60W 2510/18; B60W 2510/244; B60W 2710/021; B60W 2710/18; B60W 2710/244
See application file for complete search history.

(56) References Cited

U.S. PATENT DOCUMENTS

| | | | | |
|---|---|---|---|---|
| 2015/0344019 | A1 | 12/2015 | Matsui et al. | |
| 2016/0236671 | A1* | 8/2016 | Imamura | B60W 20/14 |
| 2020/0262413 | A1 | 8/2020 | Song et al. | |
| 2023/0009612 | A1 | 1/2023 | Cappellini et al. | |

FOREIGN PATENT DOCUMENTS

| | | | | |
|---|---|---|---|---|
| JP | 2010254176 | A | 11/2010 | |
| JP | 2016049838 | A * | 4/2016 | |
| KR | 101780289 | B1 * | 10/2017 | B60L 15/20 |
| KR | 101786338 | B1 | 10/2017 | |
| KR | 20210118611 | A | 10/2021 | |
| WO | 2019215401 | A2 | 11/2019 | |
| WO | 2021105850 | A1 | 6/2021 | |

OTHER PUBLICATIONS

English Machine Translation KR-101780289-B1 (Year: 2017).*
European Search Report cited in corresponding European patent application No. 22207173.0; May 31, 2023; 7 pp.

* cited by examiner

HYBRID ELECTRIC VEHICLE AND METHOD OF REGENERATIVE BRAKING CONTROL FOR SAME

CROSS REFERENCE TO RELATED APPLICATION

The present application claims priority to Korean Patent Application No. 10-2022-0075730, filed on Jun. 21, 2022, the entire contents of which are incorporated herein for all purposes by this reference.

TECHNICAL FIELD

The present disclosure relates to a hybrid electric vehicle that can perform more efficient regenerative braking and to a method of regenerative braking control for the same.

BACKGROUND

Recently, eco-friendly vehicles equipped with an electric motor as a power source are increasing in popularity with an increase of the interest in the environment. An eco-friendly vehicle is also called an electrified vehicle, and a Hybrid Electric Vehicle (HEV) and an Electric Vehicle (EV) are representative of eco-friendly vehicles.

A hybrid electric vehicle of eco-friendly vehicles can achieve high efficiency by selectively driving an engine and a motor, depending on the driving situation. Such a hybrid electric vehicle can be classified into various types in accordance with the connection relationship of the powertrain. A hybrid electric vehicle equipped with a powertrain in which an engine clutch is disposed between an engine and a motor and in which a driving motor is connected to the input side of a transmission is called a Transmission Mounted Electric Drive (TMED) type. A TMED-type hybrid electric vehicle is equipped with a Hybrid Starter Generator (HSG) that cranks for starting the engine or collecting kinetic energy of the engine. The HSG and the engine are generally connected through a belt.

In common TMED-type hybrid electric vehicles, when braking is required, a total braking amount (torque) according to the request of braking is calculated first. Regenerative braking is performed using a driving motor within the total braking amount. The deficit that is the difference between the total braking amount and the regenerative braking amount is made up for by hydraulic braking. This process is described with reference to FIG. 1.

FIG. 1 shows an example of a braking control type for a general hybrid electric vehicle.

Referring to FIG. 1, a total braking amount corresponding to operation of a brake pedal by a driver may be the sum of a hydraulic braking amount and a regenerative braking amount of a driving motor.

In this case, the regenerative braking amount is influenced by maximum regenerative torque of the driving motor. Hydraulic braking has to intervene when a total braking amount exceeding the maximum regenerative torque is generated.

A method of using a HSG to increase a regenerative braking amount may be considered. However, in a common TMED-type hybrid electric vehicle, if an engine is being driven and an engine clutch has been connected, when braking is required, a driver opens the engine clutch and stops the engine. Thus, the engine may be separated from a driving axle and the HSG may also be naturally disconnected from the driving axle. Accordingly, the HSG basely cannot intervene in regenerative braking. There is a problem in that, since a HSG is connected to the engine through a pulley and a belt, as described above, even if an engine clutch remains or stays connected in regenerative braking, control accuracy in transmission of regenerative braking torque to a wheel shaft is low due to a possibility of slip. Also, durability of the belt is adversely influenced in every regenerative braking.

Further, when an engine clutch is disengaged due to a braking request and reacceleration is required during braking, it is required to start the engine and connect the engine clutch again. Thus, there is a problem of delay in reacceleration.

SUMMARY

An objective of the present disclosure is to provide a hybrid electric vehicle that can perform more effective regenerative braking. Another objective is to provide a method of regenerative braking control for the hybrid electric vehicle to yield more effective regenerative braking.

Another objective of the present disclosure is to provide a hybrid electric vehicle that can quickly reaccelerate during regenerative braking. A further objective is to provide a method of regenerative braking control for the hybrid electric vehicle whereby the vehicle can quickly reaccelerate during regenerative braking.

The technical subjects to implement in the present disclosure are not limited to the technical problems described above. Other technical subjects that are not stated herein should be clearly understood by those having ordinary skill in the art from the following specifications.

In order to achieve the objectives, a method of regenerative braking control of a hybrid electric vehicle according to an embodiment of the present disclosure is provided. The method includes determining a total braking amount when a braking request is generated in a hybrid electric vehicle including a first motor connected to an engine, a second motor directly connected to an input side of a transmission, and an engine clutch having a first end connected to the first motor and a second end connected to the second motor. The method also includes additionally charging a battery using regenerative braking of the first motor when the engine clutch has been engaged in consideration of the total braking amount and charge power by regenerative braking of the second motor is lower or less than charge limit power of the battery.

For example, the method may further include keeping the engine clutch engaged when the engine clutch has been engaged at a point in time at which the braking request is generated and when the total braking amount is more or greater than base deceleration torque.

For example, the base deceleration torque may be the sum torque of regenerative braking torque of the second motor and friction torque of the engine that are based on wheels.

For example, the method may further include opening the engine clutch when the total braking amount is base deceleration torque or less.

For example, total deceleration torque of driving sources when the additional charging is performed may be the sum torque of friction torque of the engine, regenerative braking torque of the first motor, and regenerative braking torque of the second motor that are based on wheels.

For example, the method may further include performing hydraulic braking corresponding to a deficit of a braking amount when the total braking amount is more or greater than the total deceleration torque.

For example, the method may further include performing the regenerative braking using only the second motor when the engine clutch has been engaged but charge power by regenerative braking of the second motor is not lower or less than the charge limit power.

A hybrid electric vehicle (HEV) according to an embodiment of the present disclosure is provide includes a first motor directly connected to an engine. The HEV also includes a second motor directly connected to an input side of an engine. The HEV also includes an engine clutch having a first end connected to the first motor and a second end connected to the second motor. The HEV also includes a first control unit configured to determine a total braking amount when a braking request is generated. The HEV also includes a second control unit configured to perform control such that a battery is additionally charged by regenerative braking of the first motor when the engine clutch has been engaged in consideration of the total braking amount and charge power by regenerative braking of the second motor is lower or less than charge limit power of the battery.

For example, the second control unit may keep the engine clutch engaged when the engine clutch has been engaged at a point in time at which the braking request is generated and when the total braking amount is more or greater than base deceleration torque.

For example, the base deceleration torque may be the sum torque of regenerative braking torque of the second motor and friction torque of the engine that are based on wheels.

For example, the second control unit may perform control such that the engine clutch is opened when the total braking amount is base deceleration torque or less.

For example, total deceleration torque of driving sources when the additional charging is performed may be the sum torque of friction torque of the engine, regenerative braking torque of the first motor, and regenerative braking torque of the second motor that are based on wheels.

For example, the first control unit may perform control such that hydraulic braking corresponding to a deficit of a braking amount is performed when the total braking amount is more or greater than the total deceleration torque.

For example, the second control unit may perform control such that the regenerative braking is performed by only the second motor when the engine clutch has been engaged but charge power by regenerative braking of the second motor is not lower or less than the charge limit power.

For example, the second control unit may limit maximum regenerative braking torque of the first motor to a value obtained by subtracting regenerative braking torque of the second motor and friction torque of the engine from the total braking amount. The second control unit may also limit maximum regenerative braking power of the first motor to a value obtained by subtracting charge power according to regenerative braking of the second motor from the charge power limit.

According to various embodiments of the present disclosure, since not only the second motor, but also the first motor can intervene in regenerative braking, depending on a braking situation, more effective braking is possible.

Further, according to the present disclosure, when the engine clutch stays connected during braking, it is possible to use drag of an engine as a braking force and it is possible to quickly accelerate the vehicle.

Further, since a regenerative braking amount is increased and engine drag is used, the hydraulic braking amount is reduced and wear due to friction of the hydraulic braking system can also be reduced.

The effects that can be obtained by the present disclosure are not limited to the effects described above. Other effects can be clearly understood by those having ordinary skill in the art from the following description.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
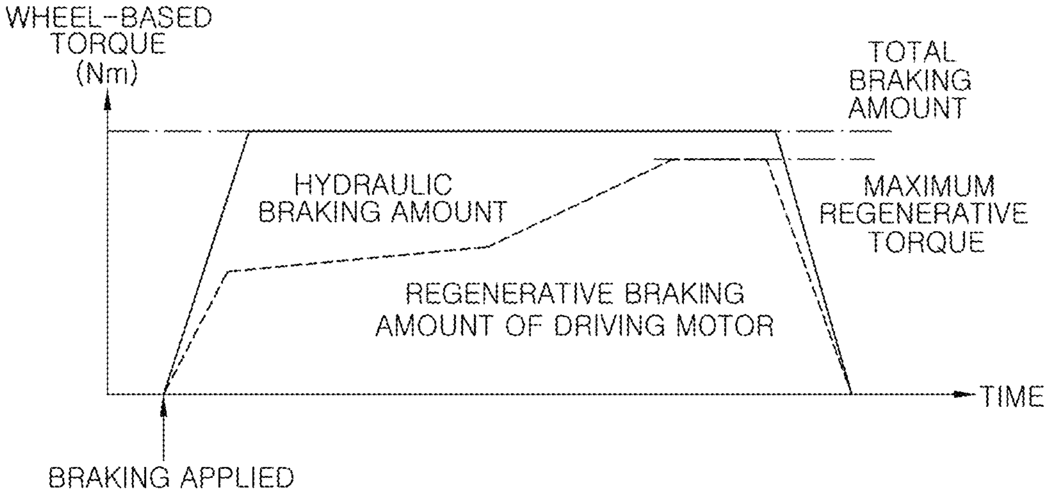
FIG. 1 shows an example of a braking control type for a general hybrid electric vehicle.

Hereafter, embodiments of the present disclosure are described in detail with reference to the accompanying drawings. The same or similar components are given the same reference numerals regardless of the numbers of figures and are not repeatedly described. Terms such as “module” and “unit” that are used for components in the following description are used only for the convenience of description without having discriminate meanings or functions. In the following description, if it has decided that the detailed description of known technologies related to the present disclosure makes the subject matter of the embodiments described herein unclear, the detailed description of same has been omitted. Further, the accompanying drawings are provided only for clear understanding of embodiments disclosed in the specification. The technical spirit disclosed in the specification is not limited by the accompanying drawings, and all changes, equivalents, and replacements should be understood as being included in the spirit and scope of the present disclosure.

Terms including ordinal numbers, such as “first”, “second”, etc., may be used to describe various components, but the components are not to be construed as being limited to the terms. The terms are used only to distinguish one component from another component.

It should be understood that, when one element is referred to as being “connected to” or “coupled to” another element, it may be connected directly to or coupled directly to another element or be connected to or coupled to another element, having yet another element intervening therebetween. On the other hand, it should be understood that, when one element is referred to as being “connected directly to” or “coupled directly to” another element, it may be connected to or coupled to another element without any other element intervening therebetween.

Singular forms are intended to include plural forms unless the context clearly indicates otherwise.

It should be further understood that the terms “includes,” “comprises,” or “have” and their derivatives as used in this specification specify the presence of stated features, steps, operations, components, parts, or a combination thereof. However, the terms do not preclude the presence or addition of one or more other features, numerals, steps, operations, components, parts, or a combination thereof.

A unit or a control unit that is included in names such as a motor control unit (MCU) and a hybrid control unit (HCU) is only a term that is generally used to name a controller that controls specific functions of a vehicle rather than meaning a generic function unit. For example, each control unit may include a communication device that communicates with another control unit or a sensor to control corresponding functions, a memory that stores an operating system or logic commands and input/output information, and one or more processors that perform determination, calculation, decision, etc. for controlling the corresponding functions. When a component, device, element, or the like of the present disclosure is described as having a purpose or performing an operation, function, or the like, the component, device, or element should be considered herein as being "configured to" meet that purpose or to perform that operation or function.

Before describing a method of regenerative braking control according to embodiments of the present disclosure, the structure and the control system of a hybrid electric vehicle that can be applied to embodiments are described first.

Figure 2:
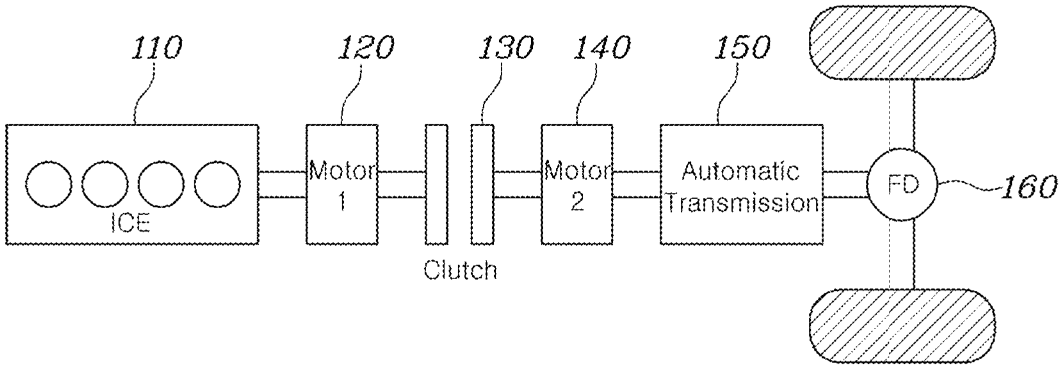
FIG. 2 shows an example of the configuration of a powertrain of a hybrid electric vehicle according to an embodiment of the present disclosure.

FIG. 2 shows an example of the configuration of a powertrain of a hybrid electric vehicle according to an embodiment of the present disclosure.

Referring to FIG. 2, a powertrain of a hybrid electric vehicle including a parallel type hybrid system in which two motors 120 and 140 and an engine clutch 130 are mounted between an engine (internal combustion engine (ICE)) 110 and a transmission 150 is shown. As described above, the parallel type hybrid system may be called a transmission mounted electric drive (TMED) hybrid system because the motor 140 is always connected to the input side of the transmission 150.

A first motor 120 of the two motors 120 and 140 is disposed between the engine 110 and a first end of an engine clutch 130. An engine shaft of the engine 110 and a first motor shaft of the first motor 120 are directly connected to each other. By such a configuration, the engine 110 and the first motor 120 can always rotate together.

A first end of a second motor shaft of a second motor 140 may be connected to a second end of the engine clutch 140. A second end of the second motor shaft may be connected to the input side of the transmission 150.

The second motor 140 can output or produce more power in comparison to the first motor 130 and can function as a driving motor. The first motor 120 can function as a starter motor that cranks the engine 110 when the engine 110 is started, can collect rotation energy of the engine 110 by generating electricity when the engine is stopped, and can generate electricity using the power from the engine 110 when the engine 110 is in operation.

In the hybrid electric vehicle having the powertrain shown in FIG. 1, when a driver starts the vehicle and depresses the accelerator pedal, the second motor 140 is driven first by the power of a battery (not shown) with the engine clutch 130 open. Accordingly, the power from the second motor 140 is transmitted to the transmission 15 and a final drive (FD) 160, whereby wheels are rotated (i.e., an Electric Vehicle (EV) mode). When more or greater driving force is needed while the vehicle is gradually accelerated, the first motor 120 is operated and can crank the engine 110.

When the rotation speed difference between the engine 110 and the second motor 140 comes into a predetermined range after the engine 110 is started, the engine clutch 130 is finally engaged and the engine 110 and the second motor 140 are rotated together (i.e., changing into an HEV mode from an EV mode). Accordingly, the power of the second motor 140 decreases and the power of the engine 110 increases through torque blending. Thus, the torque requested by the driver may be satisfied. In the HEV mode, the engine 110 can satisfy most of the requested torque and the difference between the engine torque and the requested torque can be compensated for by at least one of the first motor 120 or the second motor 140. For example, when the engine 110 outputs torque that is higher or greater than the requested torque in consideration of efficiency of the engine 110, the first motor 120 or the second motor 140 can generate electricity by the surplus of the engine torque. However, when the engine torque is lower or less than the requested torque, at least one of the first motor 120 or the second motor can output torque by the deficit.

When a predetermined engine-off condition such as deceleration of the vehicle is satisfied, the engine clutch 130 is opened and the engine 110 is stopped (i.e., changing into the EV mode from the HEV mode). A battery is charged by the second motor 140 using the driving force of wheels in deceleration, which is called braking energy regeneration or regenerative braking.

In general, the transmission 150 may be a discontinuously variable transmission or a multi-plate clutch transmission, i.e., a dual clutch transmission (DCT).

Figure 3:
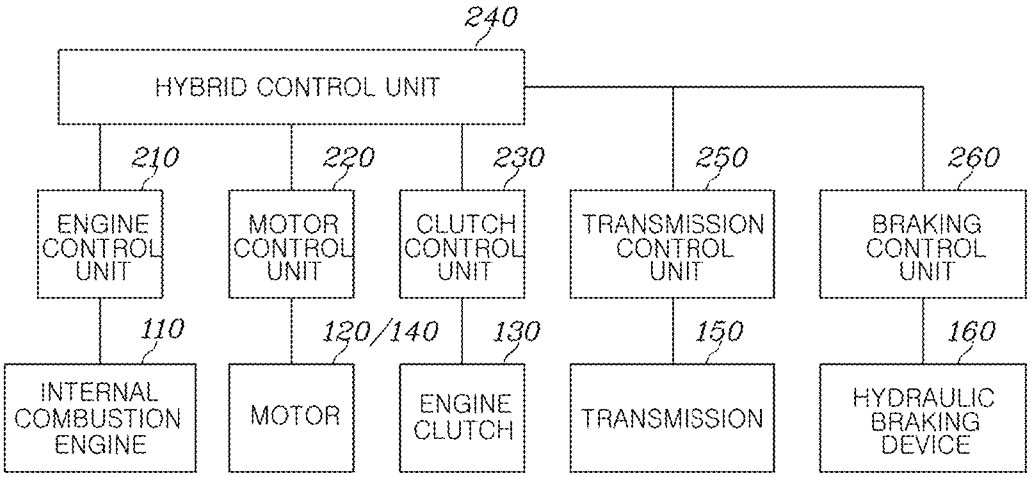
FIG. 3 shows an example of the configuration of a control system of the hybrid electric vehicle according to an embodiment of the present disclosure.

FIG. 3 shows an example of the configuration of a control system of the hybrid electric vehicle according to an embodiment of the present disclosure.

Referring to FIG. 3, in a hybrid electric vehicle to which embodiments of the present disclosure can be applied, an engine control unit 210 can control the internal combustion engine 110, a motor control unit (MCU) 220 can control torque of the first motor 120 and the second motor 140, and a clutch control unit 230 can control the engine clutch 130. The engine control unit 210 may be referred to as an engine management system (EMS). A transmission control unit 250 controls the transmission 150. A braking control unit 260 can control a hydraulic braking device 160.

The motor control unit 220 can control a gate drive unit (not shown) using a pulse width modulation (PWM) type of control signal based on a motor angle, a phase voltage, a phase current, requested torque, etc. of each of the motors 120 and 140. The gate drive unit can control an inverter (not shown) that drives each of the motors 120 and 140.

The control units are connected to a hybrid control unit (HCU) 240 that controls the entire powertrain including a mode change process as an upper control unit. Thus, a driving mode change, information for controlling the engine clutch in shifting, and/or information for controlling engine stop may be provided to the hybrid control unit 240 or operations according to control signals may be performed under control by the hybrid control unit 240.

For example, the hybrid control unit 240 determines whether to switch the EV and HEV modes or Charge Depleting (CD) and Charge Sustaining (CS) modes (in a Plug-in Hybrid Electric vehicle (PHEV)), depending on the driving state of the vehicle. To this end, the hybrid control unit determines the point in time of opening the engine clutch 130 and performs hydraulic control when the engine clutch 130 is opened. The hybrid control unit 240 can determine the states (lock-up, slip, open, etc.) of the engine clutch 130 and can control the point in time of stopping fuel injection of the engine 110. The hybrid control unit can control collection of rotation energy of the engine by transmitting a torque instruction for controlling the torque of the first motor 120 to the motor control unit 220 to control engine stop. The hybrid control unit 240, in order to satisfy requested torque, can determine the states of the driving sources 110, 120, and 140, determine requested driving force that the driving sources 110, 120, and 140 are supposed to separately take over, and transmit a torque instruction to the control units 210 and 220 that control the driving sources.

It should be apparent to those having ordinary skill in the art that the connection relationship of the control units and the functions/discrimination of the control units described above are only examples and are not limited to the names. For example, the hybrid control unit 240 may be implemented such that a corresponding function is replaced and provided by any one of the other control units, or the corresponding function may be separately provided by two or more of the other control units. As another example, the function of the clutch control unit 230 may be achieved by the hybrid control unit 240.

Meanwhile, in relation to braking, the braking control unit 260 may determine a total braking amount of the basis of a value from a brake pedal position sensor (PBS). The braking control unit 260 may also request regenerative braking to the hybrid control unit 240. The braking control unit 260 may also receive information about a regenerative braking performance amount from the hybrid control unit 240. The braking control unit 260 may also control the hydraulic braking device 160 to generate braking torque by the deficit of a braking amount (i.e., 'total braking amount-regenerative braking performance amount').

The configuration described with reference to FIGS. 2 and 3 is only an example of a configuration of a hybrid electric vehicle. It should be apparent to those having ordinary skill in the art that a hybrid electric vehicle according to the embodiments of the present disclosure is not limited to the structure described above. A braking request is a concept including not only a braking request according to operation of a brake pedal by a driver, but a braking request irrelevant to intention of a driver, for example, a braking request by an autonomous situation or intervention of an advanced driver assistance system (ADAS). However, it is assumed in the following description that a braking request is generated on the basis operation of a brake pedal by a user.

An embodiment of the present disclosure proposes selectively controlling the state of the engine clutch 130 and controlling whether the first motor 120 intervenes in regenerative braking in consideration of the vehicle state when there is a braking request. In this case, the engine clutch 130 may have been connected (engaged) when the vehicle is driven in a driving mode, in which the driving force of the engine 110 is transmitted to wheels, i.e., in an HEV-parallel mode. When the engine clutch 130 has been engaged, not only the engine 110 but also the first motor 120 have been connected to the input side of the transmission. Accordingly, in this state, the first motor 120 is directly connected to the engine 110 and can also output regenerative braking torque. The engine 110 also acts as a drag component for the input side of the transmission due to rotation friction when the engine does not perform fuel injection and ignition control, so it may be considered as contributing to braking.

In short, in an embodiment of the present disclosure, charge torque of the first motor 120, charge torque of the second motor 140, friction torque of the engine 110, and hydraulic braking torque, i.e., a total of four kinds of combinations are possible for deceleration torque with the engine clutch 130 connected. A braking type using this configuration is shown in FIG. 4.

Figure 4:
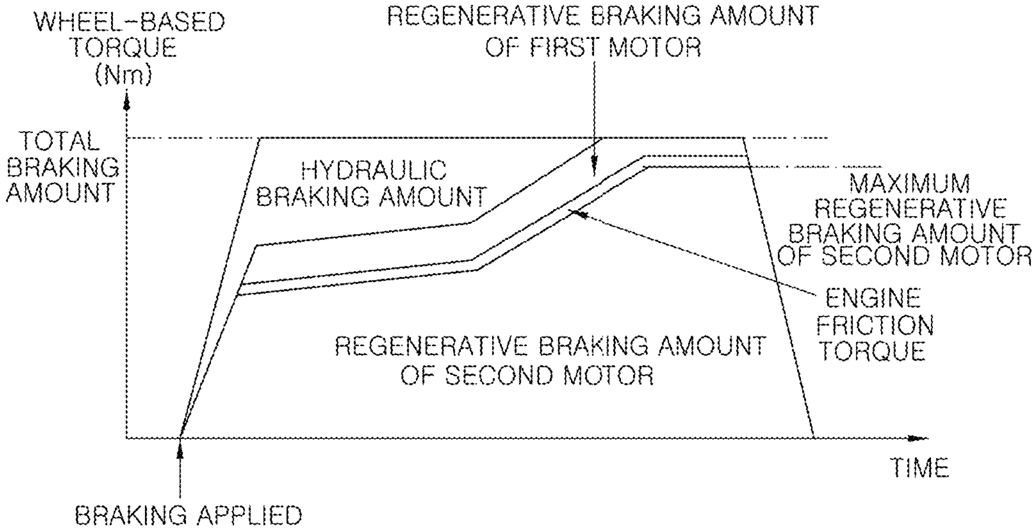
FIG. 4 shows an example of a braking control type of the hybrid electric vehicle according to an embodiment of the present disclosure.

FIG. 4 shows an example of a braking control type of the hybrid electric vehicle according to an embodiment of the present disclosure.

Referring to FIG. 4, when braking is applied, the braking control unit 260 calculates a total braking amount and braking torque can be output from the braking torque output sources to satisfy the total braking amount. When the engine clutch 130 has been engaged at the point in time of braking, not only the second motor 140 but also the first motor 120 can output regenerative braking and engine friction torque can also contribute to braking.

Accordingly, even if the total braking amount is more or greater than the maximum regenerative torque of the second motor 140, intervention of hydraulic braking can be minimized by the engine friction torque and the regenerative braking amount of the first motor 120. Therefore, according to the present disclosure, as intervention of hydraulic pressure is minimized, wear of the hydraulic braking device 150 can be reduced, and the kinetic energy that is collected through regenerative braking can be increased.

However, even if the first motor 120 and the second motor 140 each can generate the maximum charge torque in the designed specification, the total power that is generated through regenerative braking cannot exceed the charge limit power of the battery, so it should be considered in terms of power. In other words, the sum of the generated power of the first motor 120 and the generated power of the second motor 140 should be the charge limit power of the battery. Accordingly, when the second charge power of the second motor 140 is lower or less than the charge limit power of the battery after regenerative braking control is started in the present embodiment, charging by the first motor 120, i.e., intervention in regenerative braking of the first motor 120, is possible as much as the difference between the second charge power of the second motor 140 and the charge limit power of the battery after regenerative braking control.

Hereafter, a regenerative braking control process according to an embodiment is described with reference to FIG. 5.

Figure 5:
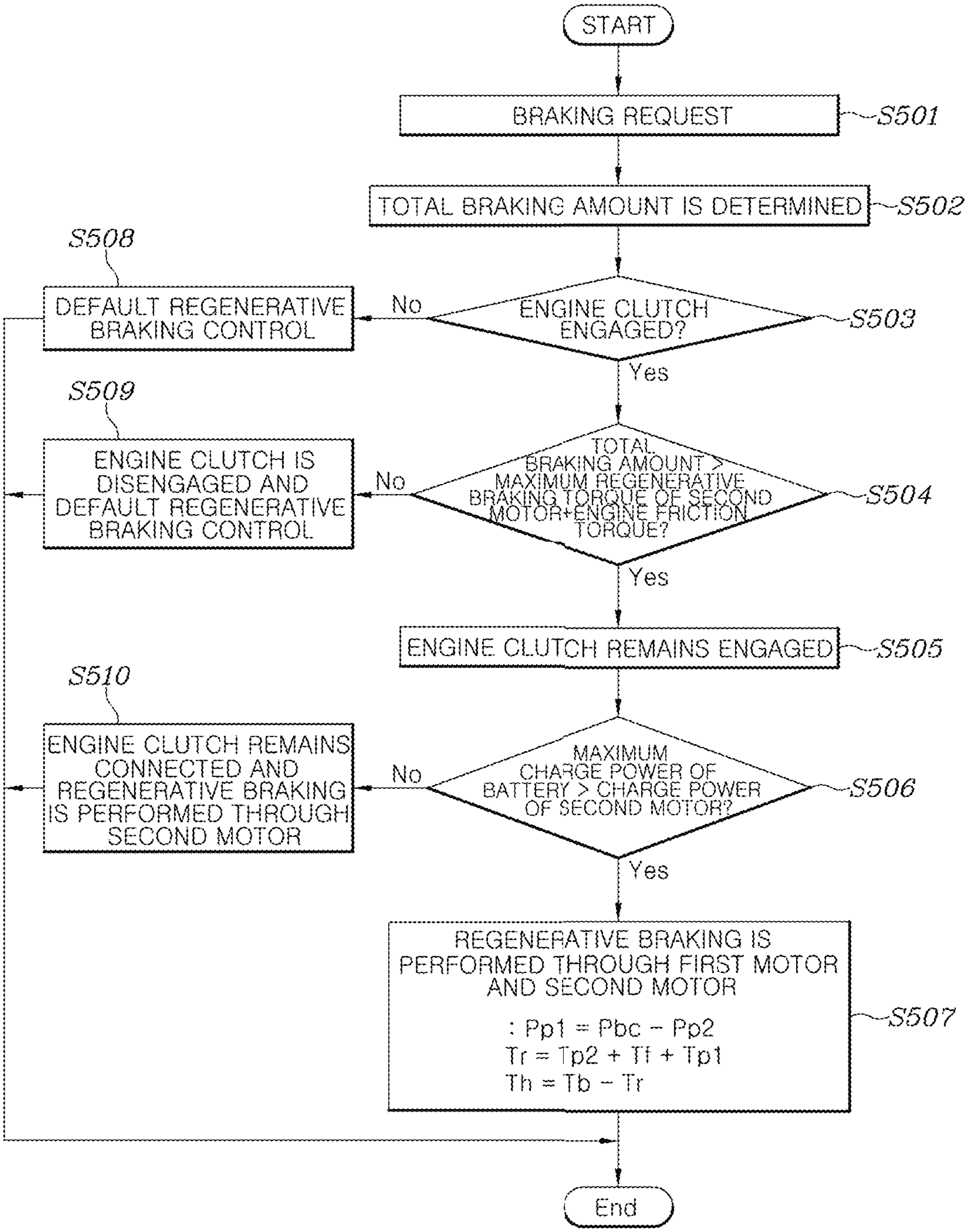
FIG. 5 is a flowchart showing an example of a regenerative braking control process of the hybrid electric vehicle according to an embodiment of the present disclosure.

FIG. 5 is a flowchart showing an example of a regenerative braking control process of the hybrid electric vehicle according to an embodiment of the present disclosure.

Referring to FIG. 5, first, a braking request may be generated (3501). As described above, a braking request may be generated not only by operation of a PBS by a driver, but during control of a vehicle by a control unit in the vehicle.

Accordingly, the braking control unit 260 can determine a total braking amount corresponding to the braking request (3502). The determined total braking amount can be transmitted to the hybrid control unit 240, and in this case, a regenerative braking request can also be transmitted.

The hybrid control unit 240 determines whether the engine clutch 130 has been engaged (3503). When the engine clutch 130 has been engaged (Yes in 3503), the hybrid control unit 240 can compare the sum of the maximum regenerative torque of the second motor and the engine friction torque with the total braking amount to determine whether to keep the engine clutch 130 engaged (3504). The reason of this comparison is described hereafter.

First, maximum deceleration torque in terms of wheel by a driving source during braking when the engine clutch 130 has been connected is as follows.

[Maximum deceleration torque=regenerative torque of second motor+engine friction torque+regenerative torque of first motor]

In this case, each torque is based on the input side of the transmission, so it may be converted into torque at the wheels by multiplying the torque by a gear ratio according to the current shift range of the transmissions 150 for comparing with the total braking amount. If the engine clutch 130 has been connected, engine friction torque is basely applied even though the first motor 120 does not output regenerative torque. Thus, the base deceleration torque is as follows under the assumption that the second motor output the maximum regenerative torque.

[Base deceleration torque=maximum regenerative torque of second motor+engine friction torque]

In this case, the maximum regenerative torque of the second motor may be maximum regenerative torque according to the current state of a power electronic element system (e.g., temperature of the second motor 140, temperature of the battery, and a battery state of charge (SOC)). The engine friction torque can be obtained by referring to data (a table) in which engine friction torque values according to revolutions per minute (RPM) are defined in advance. However, this is only an example and the present disclosure is not necessarily limited thereto.

If the total braking amount described above is more or greater than the base deceleration torque (Yes in S504), it is possible to satisfy the total braking amount while performing charging through the second motor 140. Thus, the engine clutch 130 can be maintained in the engaged state (S505). In another example, it may be possible to determine whether the total braking amount is more or greater than the torque of the second motor in order to determine whether to keep the engine clutch 130 engaged. However, in this case, the engine friction torque, having a magnitude that is difficult to freely control because it depends on the driving situation (e.g., the RPM at the input side of the transmission) due to engagement of the engine clutch 130, intervenes in this situation. It is thus difficult to maximally use the regenerative torque of the second motor. Accordingly, since regenerative efficiency decreases, it may be advantageous to consider even the engine friction torque. For example, it is assumed that the total braking amount is 110 Nm, the maximum regenerative torque of the second motor 140 is 100 Nm, and the engine friction torque according to the driving situation is 20 Nm. In this case, when the engine clutch 130 remains or stays engaged for the reason that the total braking amount is more or greater than the maximum regenerative torque of the second motor, there is a problem in that the actual regenerative torque of the second motor 140 is limited to 90 Nm because a value corresponding to RPM is basely applied as the engine friction torque. However, if even the engine friction torque is considered under the same assumption, the engine clutch 130 will be disengaged and hydraulic pressure will intervene by 10 Nm, but the regenerative torque of the second motor will be possible up to the maximum value (100 Nm).

The hybrid control unit 240 can compare a maximum charge power limit of the battery and the charge power of the second motor with each other (S506). If the charge power of second motor 140 is lower or less than the maximum charge power limit of the battery (Yes in S506), charging (regenerative braking) is possible through the first motor 120 by power corresponding to the difference between the charge power of second motor 140 and the maximum charge power limit of the battery.

In this case, the total deceleration torque Tr by driving sources may be the sum of the wheel-based regenerative torque Tp1 of the first motor, the wheel-based regenerative torque Tp2 of the second motor, and the wheel-based engine friction torque Tf (i.e., Tr=Tp2+Tf+Tp1) (S507). The hydraulic braking amount Th may be the value obtained by subtracting the total deceleration torque Tr by the driving sources from the total braking amount Tb. The maximum charge power Pp1 of the first motor 120 may be limited to the value obtained by subtracting the charge power Pp2 of the second motor 140 from the maximum charge power limit Pbc of the battery. The upper limit of the wheel-based regenerative torque of the first motor may be limited to the value obtained by subtracting the wheel-based regenerative torque of the second motor and the wheel-based engine friction torque from the total braking amount.

Meanwhile, when there is a braking request and the engine clutch 130 has not been engaged (No in S503), only the second motor 140 is connected to wheels, regenerative braking is performed using the second motor 120, and default regenerative braking control that makes up for the insufficient braking force using hydraulic braking may be performed (S508). Similarly, even if it is determined to disengage the engine clutch 130 that has been engaged (No in S504), default regenerative braking control may be performed with disengagement of the engine clutch 130 (S509).

When the engine clutch 130 stays engaged but the charge power of the second motor 140 is not lower or less than the maximum charge power limit of the battery (No in S506), regenerative braking is performed using the second motor 140 and the insufficient braking force can be made up for by hydraulic braking (S510).

According to the embodiments described above, since the first motor can intervene in regenerative braking when the charge amount of the second motor is lower or less than the maximum charge power limit of the battery, it is possible to additionally secure a charge amount of the battery, so the fuel efficiency can be improved. Further, a corresponding hydraulic braking amount is reduced by using the engine friction torque as braking torque, so wear of discs and pads of the hydraulic braking device can also be reduced. Further, it is possible to quickly accelerate a vehicle when reaccelerating the vehicle if the engine clutch stays connected or engaged.

The present disclosure can be achieved as computer-readable code on a program-recoded medium. A computer-readable medium includes all kinds of recording devices that keep or store data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage.

The detailed description should not be construed as being limited in all respects and should be construed as an example. The scope of the present disclosure should be determined by reasonable analysis of the claims and all changes within an equivalent range of the present disclosure are included in the scope of the present disclosure.

What is claimed is:

1. A method of regenerative braking control of a hybrid electric vehicle, the method comprising:

determining a total braking amount when a braking request is generated in a hybrid electric vehicle including a first motor directly connected to an engine, a second motor directly connected to an input side of a transmission, and an engine clutch having a first end directly connected to the first motor and a second end directly connected to the second motor;

keeping the engine clutch engaged when the engine clutch has been engaged at a point in time at which the braking request is generated and when the total braking amount is more than base deceleration torque; and when the engine clutch has been engaged to connect the engine and the first motor to the transmission in consideration of the total braking amount and regenerative braking of the second motor is already being performed, additionally charging a battery using regenerative braking of the first motor only while the engine clutch remains in an engaged state based on a determination that charge power by the regenerative braking of the second motor is less than charge limit power of the battery, wherein the base deceleration torque is a sum torque of maximum regenerative braking torque of the second motor and friction torque of the engine that are based on wheels.

2. The method of claim 1, further comprising:

disengaging the engine clutch when the engine clutch has been engaged at a point in time at which the braking request is generated and when the total braking amount is base deceleration torque or less.

3. The method of claim 1, wherein total deceleration torque of driving sources when the additional charging is performed is a sum torque of friction torque of the engine, regenerative braking torque of the first motor, and regenerative braking torque of the second motor that are based on wheels.

4. The method of claim 3, further comprising:

performing hydraulic braking corresponding to a deficit of a braking amount when the total braking amount is more than the total deceleration torque.

5. The method of claim 1, further comprising:

performing the regenerative braking using only the second motor when the engine clutch has been engaged but charge power by regenerative braking of the second motor is not less than the charge limit power.

6. A non-transitory computer-readable recording medium in which a program is stored for performing the method of regenerative braking control for a hybrid electric vehicle of claim 1.

7. A hybrid electric vehicle comprising:

a first motor directly connected to an engine;

a second motor directly connected to an input side of a transmission;

an engine clutch having a first end directly connected to the first motor and a second end directly connected to the second motor;

a first control unit configured to determine a total braking amount when a braking request is generated; and a second control unit configured to perform control such that when the engine clutch has been engaged to connect the engine and the first motor to the transmission in consideration of the total braking amount and regenerative braking of the second motor is already being performed, a battery is additionally charged by regenerative braking of the first motor only while the engine clutch remains in an engaged state based on a determination that charge power by the regenerative braking of the second motor is less than charge limit power of the battery, wherein the second control unit is further configured to keep the engine clutch engaged when the engine clutch has been engaged at a point in time at which the braking request is generated and when the total braking amount is more than a base deceleration torque, and wherein the base deceleration torque is a sum torque of maximum regenerative braking torque of the second motor and friction torque of the engine that are based on wheels.

8. The hybrid electric vehicle of claim 7, wherein the second control unit is further configured to perform control such that the engine clutch is disengaged when the engine clutch has been engaged at a point in time at which the braking request is generated and when the total braking amount is base deceleration torque or less.

9. The hybrid electric vehicle of claim 7, wherein total deceleration torque of driving sources when the additional charging is performed is a sum torque of friction torque of the engine, regenerative braking torque of the first motor, and regenerative braking torque of the second motor that are based on wheels.

10. The hybrid electric vehicle of claim 9, wherein the first control unit is further configured to perform control such that hydraulic braking corresponding to a deficit of a braking amount is performed when the total braking amount is more than the total deceleration torque.

11. The hybrid electric vehicle of claim 7, wherein the second control unit is further configured to perform control such that the regenerative braking is performed by only the second motor when the engine clutch has been engaged but charge power by regenerative braking of the second motor is not less than the charge limit power.

12. The hybrid electric vehicle of claim 7, wherein the second control unit is further configured to:

limit maximum regenerative braking torque of the first motor to a value obtained by subtracting regenerative braking torque of the second motor and friction torque of the engine from the total braking amount; and limit maximum regenerative braking power of the first motor to a value obtained by subtracting charge power according to regenerative braking of the second motor from the charge limit power.

* * * * *